United States Patent Office 2,957,034
Patented Oct. 18, 1960

2,957,034

CONTINUOUS PROCESS FOR FABRICATING OLEFINS BY DEHYDRATION OF ALCOHOLS IN THE HOMOGENEOUS LIQUID PHASE

François Eschard, Paris, France, assignor to Institut Francais du Petrole, Paris, France No Drawing. Filed July 29, 1955, Ser. No. 535,284

Claims priority, application France July 29, 1954

12 Claims. (Cl. 260—666)

The present invention relates to a continuous catalytic process for the manufacture of olefinic compounds starting from alcohols, which process makes it possible to obtain high yields.

The process according to this invention is characterized by the use of polar solvents which among other things reinforces the activity of the catalyst and consequently either reduces very significantly the amount of the catalyst necessary or allows the use of catalysts which are not very active, such as phosphoric acid, but which do have the advantage that they do not decompose and do not foster parasitic reactions such as polymerisation or isomerisation.

Among the polar solvents used according to this invention are phenols (phenol, cresol, xylenol . . . ) and phenolic derivatives, aromatic nitric derivatives (nitrobenzene, nitrotoluene . . .), and acetic acid and its derivatives of which should more particularly be mentioned the halogenated derivatives.

The process of the invention consists in heating and bringing to boiling the catalyst-solvent-alcohol liquid mixture, said heated mixture being homogeneous, the alcohol being fed by a continuous manner so as to keep the reaction volume fairly constant in spite of the elimination by distillation of the reaction products (olefin and water).

In order to avoid any reaction at all of the catalyst with the olefins formed which would yield heavy products, the olefin concentration is maintained at as low a point as possible in the reaction medium, and in particular any return of olefin with the reaction medium, such as the return of olefin with the reflux of the rectification column, must be avoided. In order to satisfy this latter condition, the reaction products are carried out by an excess of phenol and alcohol, which are recycled subsequently after having been freed of olefin and water.

The process involved in this invention allows, on the one hand, a considerable reduction of the quantity of the catalyst used and especially, on the other hand, a considerable improvement in the speed of reaction.

Thus, without the use of a solvent and with concentrations respectively of 160 and 200 g. per liter of phosphoric acid there are produced respectively 0.33 and 0.40 cc. of olefin per minute, while when phenol is used as solvent, lower concentrations of the catalysts—56 and 63 g. per liter, lead to much higher yields of 5 and 6 cc. of olefin per minute respectively.

The following table summarizes some of the results obtained by the use of solvents, according to this invention.

CONTINUOUS DEHYDRATION OF CYCLOHEXANOL

| Temp., °C. | Catalyst | Concentration of Catalyst, g./liter | Solvent | Percent vol. of solvent | Tot. Vol., cc. | Olefin output, cc./min. |
|---|---|---|---|---|---|---|
| 169 | $H_3PO_4$ | 160 | None | | 250 | 0.33 |
| 168 | $H_3PO_4$ | 200 | do | | 200 | 0.4 |
| 165 | $H_3PO_4$ | 62.5 | Phenol | 75 | 400 | 6 |
| 165 | $H_3PO_4$ | 55.5 | do | 55.5 | 450 | 5 |
| 160 | p. $C_6H_4CH_3SO_3H$ | 17.5 | None | | 250 | 0.44 |
| 158 | p. $C_6H_4CH_3SO_3H$ | 1.75 | Phenol | 85 | 250 | 1.6 |
| 158 | p. $C_6H_4CH_3SO_3H$ | 1.75 | do | 50 | 250 | 0.72 |
| 160 | $H_2SO_4$ | 5 | None | | 300 | 0.5 |
| 163 | $H_2SO_4$ | 5 | Phenol | 14.3 | 300 | 2 |
| 140 | $H_3PO_4$ | 62.5 | Nitrobenzene | 75 | 400 | 8 |
| 164 | p. $C_6H_4CH_3SO_3H$ | 9 | do | 25 | 250 | 0.29 |
| 145 | $H_3PO_4$ | 240 | Acetic Acid | 50 | 250 | 2.92 |
| 145 | $H_3PO_4$ | 240 | do | 85 | 250 | 3.79 |
| 165 | $H_3PO_4$ | 80 | Monochlor. acetic acid. | 50 | 250 | 4.25 |

DEHYDRATION OF OCTANOL 2 (secondary octylic alcohol)

| | | | | | | |
|---|---|---|---|---|---|---|
| 174 | $H_3PO_4$ | 55.5 | Phenol | 55.5 | 450 | 7 |
| 175 | $H_3PO_4$ | 55.5 | do | 44.5 | 450 | 3.5 |

DEHYDRATION OF OCTANOL 1 (primary octylic alcohol)

| | | | | | | |
|---|---|---|---|---|---|---|
| 210 | $H_3PO_4$ | 111 | Phenol | 55.5 | 450 | 1 |

The reaction velocity and consequently the output depends, for a given concentration of the catalyst, on the percentage of solvent used. There exists a percentage of solvent which allows a maximum reaction speed.

The following examples set forth presently-preferred representative embodiments of the invention. In these examples the parts are by weight and the temperatures are in degrees centigrade.

*Example 1*

This exemplifies the dehydration of cyclohexanol by the use of phosphoric acid as catalyst and phenol as solvent in such a volume proportion as to maintain the reaction velocity at a maximum.

7 parts (0.0715 mol.) of $PO_4H_3$, 273 parts (2.9 mol.) of phenol and 42.5 parts of cyclohexanol are admixed (the volume proportion of phenol in the mixture i.e. 85%, corresponds to those conditions where the reaction speed is at a maximum for the given weight of the catalyst).

The mixture is heated to boiling and, in order to keep the volume of the reaction mixture constant, cyclohexanol is continuously added at the rate of 97 parts per hour (0.97 mol.), the mixture being maintained at its boiling temperature (176°).

There is thus realized a production of 76.5 parts (0.93 mol.) per hour of cyclohexene, corresponding to 96% of the theoretical yield.

Example 2

This is another example of the dehydration of cyclohexanol by the use of phosphoric acid as catalyst and phenol as solvent.

A mixture of 28.5 parts of $PO_4H_3$ (0.291 mol.), 235 parts of phenol (2.5 mol.) and 100 parts of cyclohexanol (1 mol.) is heated to boiling (165°) under atmospheric pressure. Cyclohexanol is then continuously introduced at the rate of 315 parts (3.15 mol.) per hour in a manner to maintain the volume of the reaction mixture constant. There are thus produced 255 parts (3.10 mol.) of cyclohexene per hour, which represents a yield of 98.5% relative to the theoretical.

Example 3

This exemplifies the dehydration of cyclohexanol by the use of sulfuric acid as catalyst and phenol as solvent.

A mixture of 1.5 part of $SO_4H_2$, 46 parts of phenol and 236 parts of cyclohexanol is heated to boiling under atmospheric pressure. Cyclohexanol is then continuously introduced at the rate of 125 parts (1.25 mol.) per hour in a manner to maintain the volume of the reaction mixture constant. In this way, there are produced 130 parts (1.18 mol.) of cyclohexene per hour, which corresponds to 95% of the theoretical yield.

Example 4

This exemplifies the dehydration of cyclohexanol by the use of phosphoric acid as catalyst and nitrobenzene as solvent.

A mixture of 25 parts of phosphoric acid, 308 parts of nitrobenzene and 100 parts of cyclohexanol is heated to boiling under atmospheric pressure (140°). Cyclohexanol is then continuously introduced at the rate of 500 parts (5 mol.) per hour in a manner to maintain the volume of the reaction mixture constant. The resultant olefine and water are removed by distillation as they are formed. There are thus produced 402 parts (4.9 mol.) of cyclohexene per hour, which represents a yield of 98% relative to the theoretical.

Example 5

This exemplifies the dehydration of secondary octylic alcohol by the use of phosphoric acid as catalyst and phenol as solvent.

A mixture of 25 parts of phosphoric acid (0.255 mol.), 141 parts of phenol (1.5 mol.) and 205 parts of secondary octylic alcohol (1.6 mol.) is heated to boiling (175°) under atmospheric pressure. Secondary octylic alcohol is then continuously introduced at the rate of 340 parts (2.6 mol.) per hour in a manner to maintain the volume of the reaction mixture constant. There is thus realized a production of 281 parts (2.51 mol.) of octene per hour, corresponding to 96.2% of the theoretical yield.

Example 6

This exemplifies the dehydration of primary octylic alcohol by the use of phosphoric acid as catalyst and phenol as solvent.

A mixture of 25 parts of phosphoric acid (0.255 mol.), 235 parts of phenol (2.5 mol.) and 164 parts of primary octylic alcohol (1.27 mol.) is heated to boiling (210°) under atmospheric pressure. Primary octylic alcohol is then continuously introduced at the rate of 34 parts (0.262 mol.) per hour in a manner to maintain the volume of the reaction mixture constant. There are thus produced 28.8 parts (0.258 mol.) of ocetene, which represents a yield of 98% of the theoretical.

Example 7

This exemplifies the dehydration of cyclohexanol by the use of paratoluenesulfonic acid as catalyst and phenol as solvent.

0.44 part ($0.231 \times 10^{-2}$ mol.) of paratoluenesulfonic acid, 227 parts of phenol and 36 parts of cyclohexanol are admixed (the volume proportion of phenol in the mixture i.e. 85%, is such as to secure a maximum reaction speed for the given weight of the catalyst).

The mixture is heated to boiling under the atmospheric pressure and in order to keep the volume of the reaction mixture constant, cyclohexanol is continuously introduced at the rate of 96.5 parts (0.965 mol.) per hour, the reaction mixture being maintained at a temperature of 158°. There are thus produced 78 parts of cyclohexene per hour, corresponding to 98.5% of the theoretical yield.

Example 8

This exemplifies the dehydration of cyclohexanol by the use of paratoluenesulfonic acid as catalyst and nitrobenzene as solvent.

A mixture of 2.25 parts ($1.18 \times 10^{-2}$ mol.) of paratoluenesulfonic acid, 150 parts of nitrobenzene and 118 parts of cyclohexanol is heated to boiling (164°) under atmospheric pressure. Cyclohexanol is then continuously introduced at the rate of 12.2 parts (0.122 mol.) per hour in manner to maintain the volume of the reaction mixture constant. There are thus produced 9.7 parts (0.118 mol.) of cyclohexene per hour, which corresponds to 97% of the theoretical yield.

Example 9

This exemplifies the dehydration of cyclohexanol by the use of phosphoric acid as catalyst and acetic acid as solvent.

There is brought to the boil at atmospheric pressure (at a temperature of 155°) a mixture comprising 60 parts of $PO_4H_3$, 223 parts of pure acetic acid and 36 parts of cyclohexanol, such proportions corresponding to the maximum speed of reaction when this solvent is employed. Cyclohexanol is then continuously introduced at the rate of 229 parts (2.29 mol.) per hour, so as to maintain the reaction volume constant. There are thus obtained 182 parts (2.25 mol.) of cyclohexene per hour which corresponds to a yield of 98.5% of theoretical.

Example 10

This exemplifies the dehydration of cyclohexanol by the use of phosphoric acid as catalyst and monochloroacetic acid as solvent.

In a first stage there is introduced into the reactor a mixture of 118 parts of cyclohexanol and 175 parts of monochloroacetic acid. This mixture is heated to boiling under the atmospheric pressure (boiling point of 180°). At the end of 3½ hours, the formation of cyclohexene is not to be observed.

Following the introduction of 20 parts of $PO_4H_3$, there is to be observed the rapid formation of cyclohexene and water. By proceeding in these conditions in continuous operation there is obtained at a temperature of 165°, at output of 207 parts of cyclohexene (2.52 mol.) per hour on the basis of 257 parts (2.57 mol.) of cyclohexanol per hour introduced, this corresponding to a yield of 98% relative to the theoretical.

It will be understood that this invention is susceptible to further modification and, accordingly, it is desired to comprehend such modifications within this invention as may fall within the scope of the appended claims.

What is claimed is:

1. A catalytic method for the production of an olefin by the dehydration of the corresponding alcohol having the same number of carbon atoms per molecule, which method comprises the steps of heating to a temperature in the range of 140° to 210° C. a mixture of the alcohol, a polar organic acidic solvent and a dehydrating acid catalyst, said mixture being in the homogeneous liquid phase at said temperature range, in which liquid phase said alcohol is being dehydrated to form the corresponding olefin, and distilling off the formed olefin.

2. The method as described in claim 1, characterized in that said solvent is a member of the group consisting of phenols, acetic acid and halogenated acetic acids.

3. The method as described in claim 1, characterized in that said solvent is phenol.

4. The method as described in claim 1, characterized in that said solvent is acetic acid.

5. The method as described in claim 1, characterized in that said solvent is a halogenated derivative of acetic acid.

6. The method as described in claim 1, characterized in that said solvent is a monochloroacetic acid.

7. The method as described in claim 1, characterized in that said solvent is a dichloroacetic acid.

8. The method as described in claim 1, characterized in that said solvent is a fluorinated acetic acid.

9. The method as described in claim 2, characterized in that the catalyst is a member of the group consisting of sulfuric acid, phosphoric acid and paratoluene sulfonic acid.

10. A catalytic method for the continuous production of an olefin by the dehydration of the corresponding alcohol having the same number of carbon atoms per molecule, which method comprises the steps of heating to a temperature in the range of 140° to 210° C. a mixture of the alcohol, a dehydrating acid catalyst and a polar organic acidic solvent, said mixture being in the homogeneous liquid phase at said temperature range, in which liquid phase said alcohol is being dehydrated to form the corresponding olefin, continuously distilling off the formed olefin, while the dehydration is in progress, and continuously feeding fresh alcohol to the heated mixture so as to maintain the volume of the latter substantially constant during the entire dehydration.

11. The method as described in claim 10, characterized in that the solvent is a member of the group consisting of phenols, acetic acid and halogenated acetic acids.

12. The method as described in claim 11, characterized in that the catalyst is selected from the group consisting of sulfuric acid, phosphoric acid and paratoluene sulfonic acid.

References Cited in the file of this patent
UNITED STATES PATENTS

| | | |
|---|---|---|
| 2,345,625 | Palmer et al. | Apr. 4, 1944 |
| 2,399,049 | Manninen | Apr. 23, 1946 |
| 2,478,270 | Ipatieff et al. | Aug. 9, 1949 |
| 2,527,120 | Denivelle | Oct. 24, 1950 |

OTHER REFERENCES

Sabatier: "Catalysis in Organic Chemistry" (1923), Van Nostrand Company, New York (pages 269–271 relied on).

McBee et al.: Journal of Amer. Chem. Soc., vol. 75 (1953), pages 2324–2327.

Newman: "Journal of American Chemical Society," vol. 75 (1953), pages 4740–2.